(12) United States Patent
Heeren et al.

(10) Patent No.: US 6,311,288 B1
(45) Date of Patent: *Oct. 30, 2001

(54) SYSTEM AND METHOD FOR VIRTUAL CIRCUIT BACKUP IN A COMMUNICATION NETWORK

(75) Inventors: Theodore E. Heeren, Seminole; Suzanne Hassell, Clearwater; Richard A. Mundwiler, Safety Harbor, all of FL (US)

(73) Assignee: Paradyne Corporation, Largo, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,702

(22) Filed: May 28, 1998

Related U.S. Application Data

(60) Provisional application No. 60/077,849, filed on Mar. 13, 1998.

(51) Int. Cl.$^7$ .............. H04B 1/74; G06F 11/00; G01R 31/08
(52) U.S. Cl. .............. 714/4; 709/239; 714/43; 370/217; 370/225
(58) Field of Search .............. 714/1, 2, 4, 40, 714/43; 709/227, 228, 239; 370/216, 217, 218, 221, 225, 409, 397, 399

(56) References Cited

U.S. PATENT DOCUMENTS

| | | | |
|---|---|---|---|
| 4,993,015 | * 2/1991 | Fite, Jr. .............. | 370/218 |
| 4,999,829 | * 3/1991 | Fite, Jr. et al. .............. | 370/218 |
| 5,016,243 | * 5/1991 | Fite, Jr. .............. | 370/218 |
| 5,239,537 | * 8/1993 | Sakauchi .............. | 370/218 |
| 5,561,766 | * 10/1996 | Kitamori .............. | 714/43 |
| 5,590,118 | * 12/1996 | Nederlof .............. | 370/218 |
| 5,654,966 | 8/1997 | Lester, Jr. et al. .............. | 370/392 |
| 5,768,271 | * 6/1998 | Seid et al. .............. | 370/389 |
| 5,854,899 | * 12/1998 | Callon et al. .............. | 709/238 |
| 5,856,981 | * 1/1999 | Voelker .............. | 714/712 |
| 5,946,670 | * 8/1999 | Motohashi et al. .............. | 705/400 |

OTHER PUBLICATIONS

Tanenbaum, Andrew S., "Computer Networks", Prentice Hall, Third Edition, p. 179, 1996.*

* cited by examiner

Primary Examiner—Norman M. Wright
Assistant Examiner—Christopher A. Revak
(74) Attorney, Agent, or Firm—Thomas, Kayden, Horstemeyer & Risley, L.L.P.

(57) ABSTRACT

A system and method for the detection of permanent virtual circuit failures in a communication network determines and classifies failures based upon physical or logical criteria. Upon detection of a physical failure or a logical failure the virtual circuit backup logic will establish an alternate path in order to selectively reroute information avoiding the failed primary path. Once the primary path is again available, the logic of the present invention will restore the communication from the alternate path to the primary path. The virtual circuit backup logic will selectively provide an alternate path for communication traffic on a per data link connection identifier (DLCI) basis, thus enabling a single link to be backed up over multiple links.

40 Claims, 5 Drawing Sheets

SYSTEM AND METHOD FOR VIRTUAL CIRCUIT BACKUP IN A COMMUNICATION NETWORK

CROSS REFERENCE TO RELATED APPLICATION

This document claims priority to and the benefit of the filing date of and commonly assigned provisional application entitled VIRTUAL CIRCUIT BACKUP IN A FRAME RELAY NETWORK, assigned Ser. No. 60/077,849, filed Mar. 13, 1998, and hereby incorporated by reference.

BACKGROUND OF THE INVENTION

1. Field of the Invention

The present invention relates generally to data communications, and more particularly, to a system and method for virtual circuit backup in a communication network.

2. Related Art

In the field of data communications, a modem is used to convey information from one location to another. Digital technology now enables other communication devices, such as data service units (DSU's) to communicate large amounts of data at higher speeds. The communication scheme employed by these devices generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is Internet Protocol (IP) which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user.

This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility, and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful with employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connection less, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, network outages are compensated for by providing some manner of backup. For example, if a particular circuit fails, an alternative circuit may be created to transport the data that can no longer be transported on the primary connection.

Typically, a router is relied upon to detect and react to network failures, and it is common for routers to perform this function in a similar manner for both circuit switched and non-circuit switched connections. Failure detection in a frame relay network is inherently more complex since failures can be sensed at both the physical level and the logical level. The frame relay logical management interface (LMI) protocol provides for the detection and notification of failures of both the entire link as well as individual circuits carried by that link. It is common for routers to disregard some or all of the possible failure notifications, to fail to detect those conditions in a timely manner (such as awaiting an LMI time-out condition following a physical failure indication) and to react to those conditions in a manner which is not optimized for a frame relay network. For example, the rerouting of all circuits upon the failure of a single circuit.

One problem with current systems is that physical link failures (layer 1 of the OSI model) alone may not trigger the establishment of a backup path. Equally, an LMI failure may not trigger the establishment of a backup path or may do so only after the LMI protocol timers have expired (often 40 seconds or more).

In addition, once a failure is detected and a backup path is established, all the primary data traffic will be routed on the backup path, even if only a partial fault (such as the failure of one virtual circuit) has occurred. For example, data transmitted over a frame relay network often suffers only a partial fault, or a network failure at some intermediate point across which only a portion of the data passes.

Therefore, it would be desirable to provide a system and method that will detect the failure of a physical link, as well as the failure of a logical link, in a frame relay network and perform backup based upon the physical failure, and furthermore, that will selectively configure the establishment of a backup circuit and restore the primary circuit based upon the particular virtual circuit failure that occurs.

SUMMARY OF THE INVENTION

The present invention provides an improvement to a communication environment by enabling the detection of a failure and the subsequent backup of a failed virtual circuit in a communication system.

This task is accomplished by providing a system for fault detection and rerouting of information from a primary path to an alternate path in a communication network, comprising means for detecting, in a communication system having a plurality of endpoints, a failure in a primary path virtual circuit. The detected failure is then classified as a physical failure or a logical failure. Finally, means are provided for rerouting information to the proper endpoint over an alternate path to avoid the failed primary path virtual circuit.

The present invention can also be conceptualized as a method for fault detection and rerouting of information from a primary path to an alternate path in a communication network comprising the following steps. First a failure of a primary path virtual circuit is detected in a communication system having a plurality of endpoints. Then the failure is classified based upon whether it represents a physical failure or a logical failure. Then the information to be transmitted is rerouted over an alternate path to avoid the failed circuit.

The invention has numerous advantages, a few of which are delineated hereafter, as merely examples.

An advantage of the present invention is that it provides for a convenient method for detecting a failure in a communication network.

Another advantage of the present invention is that it provides for a convenient method for detecting and categorizing failures in a packet-switched network.

Another advantage of the present invention is that it can sense the failure of a physical link, as well as the failure of a logical link in a network.

Another advantage of the present invention is that upon sensing a network failure it can quickly establish a backup link to continue the transport of information.

Another advantage of the present invention is that it can selectively backup certain failures without rerouting all information to be transmitted.

Another advantage of the present invention is that by considering both physical and logical factors, a failure condition can be detected and reacted to quickly.

Another advantage of the present invention is that it functions transparently to a router or other communications devices connected to a network.

Another advantage of the present invention is that it allows a single link to be backed up over multiple links. All circuits of a failed link need not be rerouted to the same backup link.

Another advantage of the present invention is that it detects and reacts to failures which are irrecoverable, such as the failure of an attached router, and thereby avoids unnecessary operations.

Another advantage of the present invention is that it is simple in design, reliable in operation, and its design lends itself to economical mass production in communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE PREFERRED EMBODIMENT

The virtual circuit backup logic of the present invention can be implemented in software, hardware, or a combination thereof. In the preferred embodiment, the virtual circuit backup logic is implemented in software that is stored in a memory and that is executed by a suitable microprocessor (uP) situated in a communications device. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method. Furthermore, the preferred embodiment of the virtual circuit backup logic is illustrated in the context of a frame relay communications network, however, the concepts and principles of the virtual circuit backup logic are equally applicable to other communication techniques, such as asynchronous transfer mode (ATM) or X.25.

Figure 1:
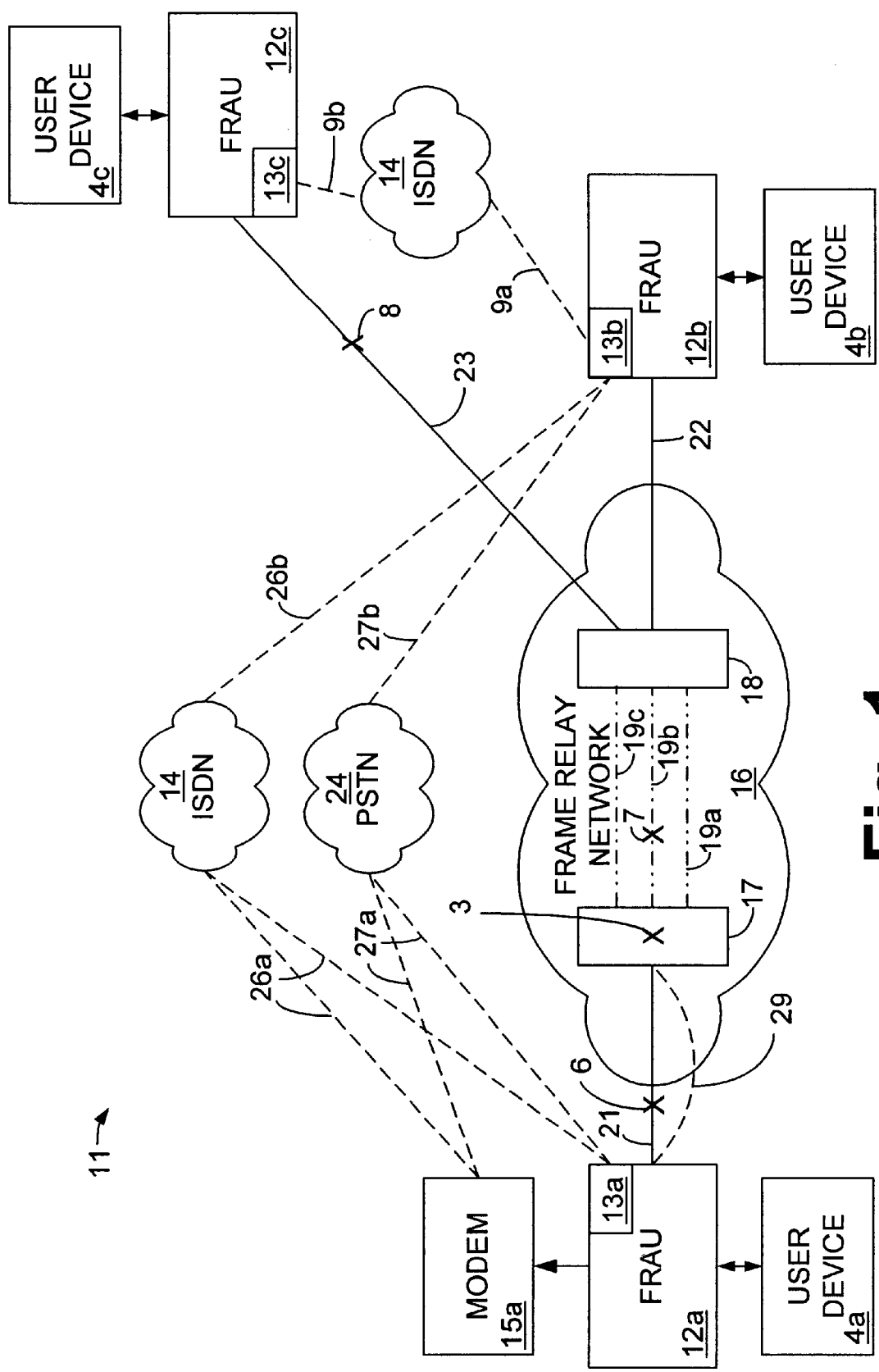
FIG. 1 is a block diagram of a network model illustrating the framework within which the resent invention resides.

FIG. 1 shows a communication topography 11 in which communications devices containing the virtual circuit backup logic operate. In general, the communications environment includes a plurality of user devices 4 each connected to a plurality of frame relay access units (FRAU's) 12. FRAU's 12 are considered communication endpoints and communicate over frame relay network 16 in a conventional manner. Frame relay network 16 includes components that are known in the art and illustratively connects to FRAU's 12a, 12b and 12c over connections 21, 22 and 23, respectively. Connections 21, 22 and 23 are physical links and can be, for example, T1/E1 service or any digital data service (DDS).

Frame relay network 16 is typically characterized by a mesh network of links (not shown) interconnecting a matrix of intermediate nodes (not shown) through frame relay switches 17 and 18. For simplicity only two frame relay switches are illustrated herein. The links are identified by data link connection identifiers (DLCI's), which are used to identify the logical connection over which the subject data is transported. The use of DLCI's allows multiple logical connections to be multiplexed over the same channel.

Information is communicated over the frame relay network in discrete packets, which may be time multiplexed across shared or common communication links. For example, FRAU 12a may communicate with FRAU 12b over a predefined communication path or link within the frame relay network. This communication path will generally be defined by a number of intermediate nodes. The communication link that interconnects FRAU 12a and FRAU 12b may be completely separate and distinct from that which interconnects FRAU 12a and 12c. Alternatively, a segment of the two above-described communication links may be shared. Whether the links are separate or shared is a function of a number of factors, and generally is determined by the service provider.

Within frame relay network 16 the communication path between FRAU 12a and FRAU 12b, for example, will be the same in both directions. That is, data transmitted from FRAU 12a to FRAU 12b will traverse the same path (i.e., interconnecting, intermediate nodes) as will data transmitted from FRAU 12b to FRAU 12a. This path of intermediate nodes is defined by data link communication identifiers (DLCI's), and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end points. If for some reason or another the service provider decides to change the interconnecting path (i.e., reconfigure or redefine the intermediate nodes), the service provider will communicate this changed communication path to the users and a new set of DLCI's will be used in order to properly route the data from end point to end point. DLCI's are assigned to and define all the points in a network through which data passes. For simplicity the virtual circuit backup logic 100 is described herein as applying to permanent virtual circuits (PVC's), however, the virtual circuit backup logic 100 is equally applicable to communication networks employing switched virtual circuits (SVC's).

PVC's 19a, 19b, and 19c illustrate the concept of multiple communication paths within frame relay network 16. Frame relay network 16, like all communication networks, may occasionally experience the failure of a virtual circuit. These failures may be in the physical link (i.e., as illustrated by break 6 in line 21), they may be in a particular PVC (i.e., as illustrated by break 7 in PVC 19b), or they may be failures of the LMI link (i.e., as illustrated by break 3 in frame relay switch 17). These failures may occur for reasons such as a physical line failure, a failure in a telephone company central office, or a failure in one of the above-mentioned intermediate nodes that make up a particular PVC.

When one of the PVC's fail it is desirable to be able to sense the failure and reroute the information to be transmitted on the failed PVC along a backup path. An alternate backup can be provided by for example, an integrated services digital network (ISDN) basic rate interface (BRI) 14, illustrated by paths 26a and 26b; by the public switched telephone network (PSTN) 24, illustrated by paths 27a and 27b, or by the frame relay network 16 through an alternate virtual circuit, illustrated by path 29. Path 29 illustrates that an alternate virtual circuit may be available on the same physical path as the primary path.

When a failure in either a physical link or a logical link is sensed by any FRAU 12, the FRAU initiates a backup connection along one of the above-mentioned paths via one of the following. A dial backup module 13 installed in each FRAU 12 may provide access to a backup path, an external device such as a modem or ISDN terminal adapter (not shown) may provide access to a backup path, or another frame relay virtual circuit on the same (or different) port may provide access to a backup path. For simplicity, modem 15a is shown as connecting only to backup paths 26a and 27a. However, if an external modem is chosen for providing access to a backup path, each FRAU will be connected to a modem.

In this example, it is also possible for a FRAU 12c to backup to a neighbor FRAU 12b. In this case, FRAU 12c is also equipped with dial backup module 13c, which allows FRAU 12c to communicate with FRAU 12b if a failure such as the failure of primary connection 23 illustrated by break 8 occurs. Once break 8 is sensed by FRAU 12c backup will be initiated as will be described with respect to FIGS. 3, 4 and 5. FRAU 12b will reroute the data traffic from FRAU 12c toward FRAU 12a along with the data traffic normally communicated between FRAU 12b and FRAU 12a.

Figure 2:
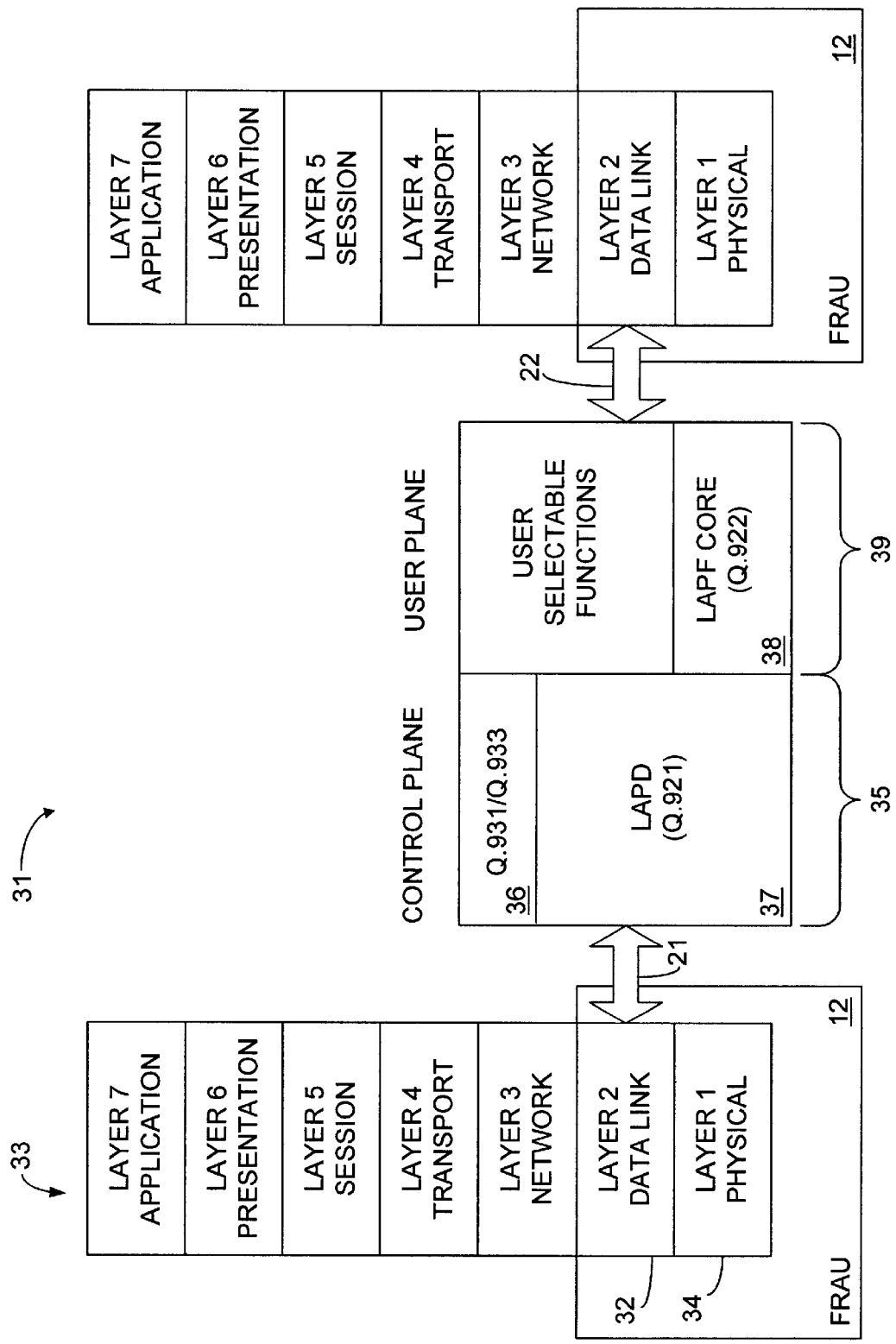
FIG. 2 is a schematic view illustrating the layers of the OSI seven layer model in which devices employing the virtual circuit backup logic of the present invention operate.

FIG. 2 shows a block diagram of a network model 31 illustrating the framework within which the present invention resides. The logic of the present invention resides within each frame relay access unit (FRAU) 12. FRAU 12 is typically the device that connects user equipment to a frame relay network. FRAU 12 typically communicates over a frame relay network using layer 2, or the data link layer 32, of the OSI seven layer model 33. FRAU 12, however, is also aware of layer 1, or the physical layer 34 of the OSI 7-layer model, since it contains a physical layer access device, such as a DSU. The virtual circuit backup logic of the present invention capitalizes on the feature of FRAU 12 being aware of the physical layer 34 of the OSI 7-layer model as well as being aware of layer 2, the data link layer 32. In this manner, the virtual circuit backup logic of the present invention (to be discussed hereafter with respect to FIGS. 3 and 4 can operate to sense a physical link failure (i.e., a layer 1 failure) as well as a logical link failure (i.e., a failure in the data link layer), and therefore, establish a backup connection without having to wait for the indication of a logical link failure.

Contained at the data link layer 32 are the standards and protocols (including the logical management interface (LMI)) that enable the transport of frame relay data. The protocol architecture that supports frame relay transport can be considered to reside in two planes of operation. The control plane 35 and the user plane 39. The control plane allows signaling to control the establishment and termination of transportation services on the user plane. At the data link layer 32, LAPD (Q.921) (Link Access Procedure on the D channel) 37 is used to provide a reliable data link control service with error control and flow control. This data link control service is used for the exchange of Q.931/Q.933 control signaling messages 36. For the transfer of information between end users, the user plane 39 protocol is LAPF (Q.922) (Link Access Procedure for Frame-Mode Bearer Services) 38. The protocol Q.922, among other things, includes an address header that is applied to a data packet and provides the addressing for the frame relay packet.

The physical layer includes the hardware connections and physical media that enable the transport of information over the network. As recited above, because the FRAU 12 is aware of the physical link, any physical link failures can be acted upon immediately by the virtual circuit backup logic of the present invention in order to quickly and efficiently establish a backup route to bypass a failed connection.

Figure 3:
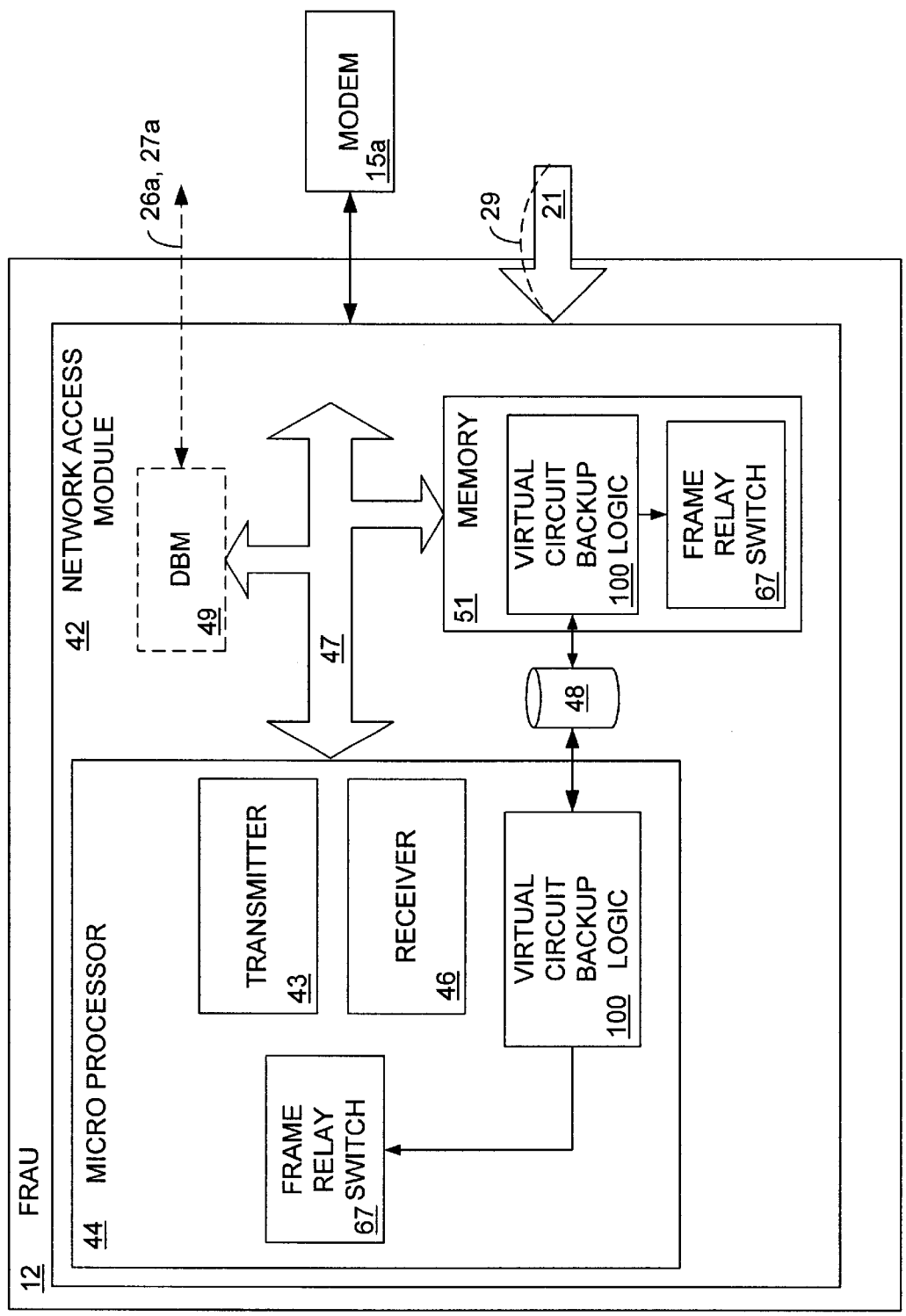
FIG. 3 is a block diagram illustrating a frame relay communication device employing the virtual circuit backup logic of the present invention.

Referring now to FIG. 3, shown is a schematic view illustrating a communications device, for example but not limited to, a frame relay access unit (FRAU) 12, containing the virtual circuit backup logic 100 of the present invention. FRAU 12 contains network access module (NAM) 42, which includes a number of conventional components that are well known in the art of data communications. Microprocessor (uP) 44 is configured to control the operation of the FRAU's transmitter 43, receiver 46 and frame relay switch 67, and is configured to couple to memory 51 over bus 47.

Communication channel 21 is typically the physical wire that extends from a frame relay network and connects to NAM 42 to provide access into a frame relay network. However, communication channel 21 can be any medium for connecting the FRAU 12 to a communication network. Also included in FRAU 12 is memory 51 which includes the virtual circuit backup logic 100 of the present invention and frame relay switch 67. Virtual circuit backup logic 100 is configured to enable and drive uP 44 to allow the sensing and bypassing of a physical or logical network failure. Because virtual circuit backup logic 100 is an algorithm that is executed by uP 44, it is depicted as residing within both memory 51 and uP 44. Similarly, frame relay switch 67 resides in memory 51 and executes in uP 44.

Also included in FRAU 12 is configuration database 48. Configuration database 48 communicates with virtual circuit backup logic 100 in order to provide alternative routing configurations to FRAU 12 in the event of any detected failure, whether a physical link failure, a failure of the LMI link, or a failure of a specific virtual circuit (as reported by the LMI link). Configuration database 48 may be user configurable, which allows a user to specify an alternate path for each primary DLCI. Illustratively, FRAU 12 also includes dial backup module 49 which communicates with the virtual circuit backup logic 100 to provide an alternative connection over, for example, path 26a or path 27a of FIG. 1 in the event of a virtual circuit failure. Dial backup module 49 is illustrated using a dotted line because there are other ways in which backup may be established. Dial backup module 49 represents a device internal to FRAU 12. An external device, such as a modem (15a) or ISDN terminal adapter (not shown), or another frame relay virtual circuit (29) on the same (or different) port may provide the alternate destination of a circuit.

Figure 4:
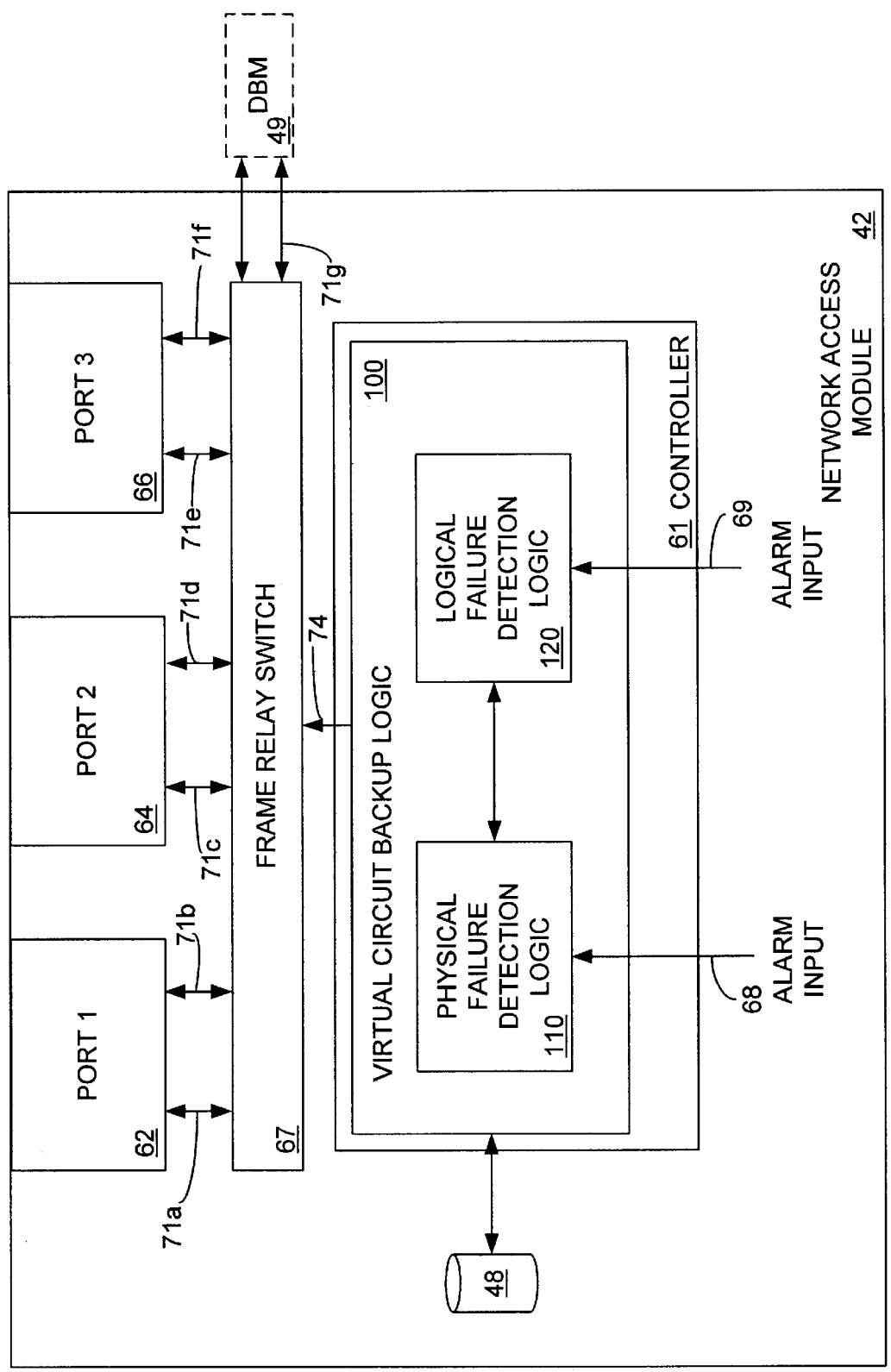
FIG. 4 is a block diagram view illustrating the network access module of FIG. 3 including the virtual circuit backup logic.

FIG. 4 shows a block diagram view illustrating the network access module of FIG. 3 including virtual circuit backup logic 100.

Network access module (NAM) 42 illustratively includes communication port 1 62, communication port 2 64 and communication port 3 66. Any port can be designated an alternate destination, or backup, for a given virtual circuit. Ports 1, 2, and 3 each connect to frame relay switch 67 through standby circuits 71a through 71g.

Standby circuits 71a through 71g may exist on any port and provide the connection through which the virtual circuit backup logic 100 provides an alternate route for a failed virtual circuit. Illustratively, DBM 49 is shown as connected to frame relay switch 67 through standby circuit 71g, thus providing an additional physical port. Ports 1 62, 2 64 and 3 66 can be used as the access ports to an alternate path if modem 15a (FIGS. 1 and 2) or alternate frame relay virtual circuit 29 (FIGS. 1 and 2) is employed.

The operation of frame relay switch 67 will be discussed hereafter. Frame relay switch 67 receives configuration updates from controller 61, which contains the virtual circuit backup logic 100 of the present invention, through connection 74.

Controller 61 contains the virtual circuit backup logic 100 that enables FRAU 12 to sense both a physical failure and a logical failure, and quickly establish a backup connection in accordance with that described with reference to FIGS. 1 and 3. Virtual circuit backup logic 100 detects the failure of a permanent virtual circuit (PVC) or switched virtual circuit (SVC), whether caused or reported through physical or logical means.

Virtual circuit backup logic 100 includes physical failure detection logic 110 and logical failure detection logic 120. Physical failure detection logic 110 is configured to receive alarm input on line 68. The alarm information supplied on line 68 depends upon the type of physical connection 21 in use. For example, in the case of a T1 link, all normal alarm conditions (e.g., no signal, out of frame, etc.) are monitored and if any of those conditions exist, physical failure detection logic 110 will consider the link to be in a "failure" state. If, for example, the physical connection 21 is a V.35 link, the data terminal ready (DTR) signal is monitored to determine physical link availability. If the DTR is down, the link is considered to be in a failure state.

The above-mentioned failure modes are meant for illustration purposes only. The virtual circuit backup logic 100 of the present invention will use any available alarm condition supplied by any physical link to sense a physical failure and immediately establish a backup connection. In this manner, the virtual circuit backup logic 100 of the present invention can act immediately on a physical link failure without having to wait for a logical link failure. In other words, because FRAU 12 is aware of the physical layer connection, backup can be implemented immediately upon the sensing of a physical failure.

In a manner similar to that described with respect to physical failure detection logic 110, logical failure detection logic 120 receives alarm input on line 69. Logical failure detection logic 120 determines whether the data link layer is in an alarm condition. If a logical failure is detected, the logical information is used to determine the affected virtual circuits.

An LMI failure is characterized as the inability to exchange LMI protocol frames over the link. The LMI protocol requires a periodic exchange of "link integrity verification" messages. If a specific number of these exchanges fail to occur in a specific period of time, the link is declared to be "down". An LMI failure may be caused by the failure of a frame relay switch in the network as illustrated by break 3 in FIG. 1, or possibly by severe interference on the physical link between the frame relay switch and the FRAU. This interference may not be sufficiently severe to be detected as a physical failure.

The LMI protocol also provides the ability for the network to inform a FRAU of the status of each virtual circuit belonging to the FRAU. For example, when break occurs in FIG. 1, the associated virtual circuit (19b of FIG. 1) is declared inactive and is reported as such in a subsequent LMI protocol message.

In addition, failures may be indicated by the proprietary detection of a PVC failure (using a diagnostic channel as known in the art) or if a performance threshold fails to be met, for example, by a high error rate.

Once a failure is detected, the NAM 42 in conjunction with the virtual circuit backup logic 100 will establish a backup connection over a backup network. As described with respect to FIG. 1, the backup network can be for example, an ISDN BRI, a PSTN, or another virtual circuit. Once the backup network is established, the virtual circuit backup logic 100 will reroute data along the backup network until the primary network is again fully available. If there is a partial failure of the frame relay network the virtual circuit backup logic 100 will only reroute the affected traffic. Once the backup link is established, the switch to backup is synchronized through the logical management interface (LMI) running over the backup link. As a primary destination circuit fails, so long as it has an alternate destination circuit configured to the same destination that is being backed up, the data for that DLCI will be switched over the alternate circuit and the activation of that alternate circuit communicated via the alternate link LMI. This allows for synchronization of switching data to the backup link. Additionally, only DLCI's that are down are backed up. As the primary destination circuits recover, the data will be switched back to the primary circuit and the alternate destination DLCI will become inactive.

Frame relay switch 67 examines each frame in accordance with the data link layer protocols and determines the destination of that frame based upon user configuration. The user configuration essentially specifies a connection (and optionally, a contingent connection). The following table sets forth an example.

TABLE 1

| Source | Primary Destination | Alternate Destination |
|---|---|---|
| Port 1 (DLCI 10) | Port 2 (DLCI 32) | None |
| Port 1 (DLCI 20) | Port 2 (DLCI 54) | Port 3 (DLCI 54) |

The virtual circuit backup logic 100 monitors alarm conditions as mentioned above and dynamically updates the port configuration to frame relay switch 67 over connection 74 using configuration database 48. For example in the first connection above, all frames received on port 1 DLCI 10 are switched to Port 2 DLCI 32. In the second connection, all frames received on Port 1 DLCI 20 are switched to Port 2 DLCI 54. If the primary destination (Port 2 DLCI 54) is unavailable (such as in the case of a PVC failure) the frames are switched to Port 3 DLCI 54.

Figure 5:
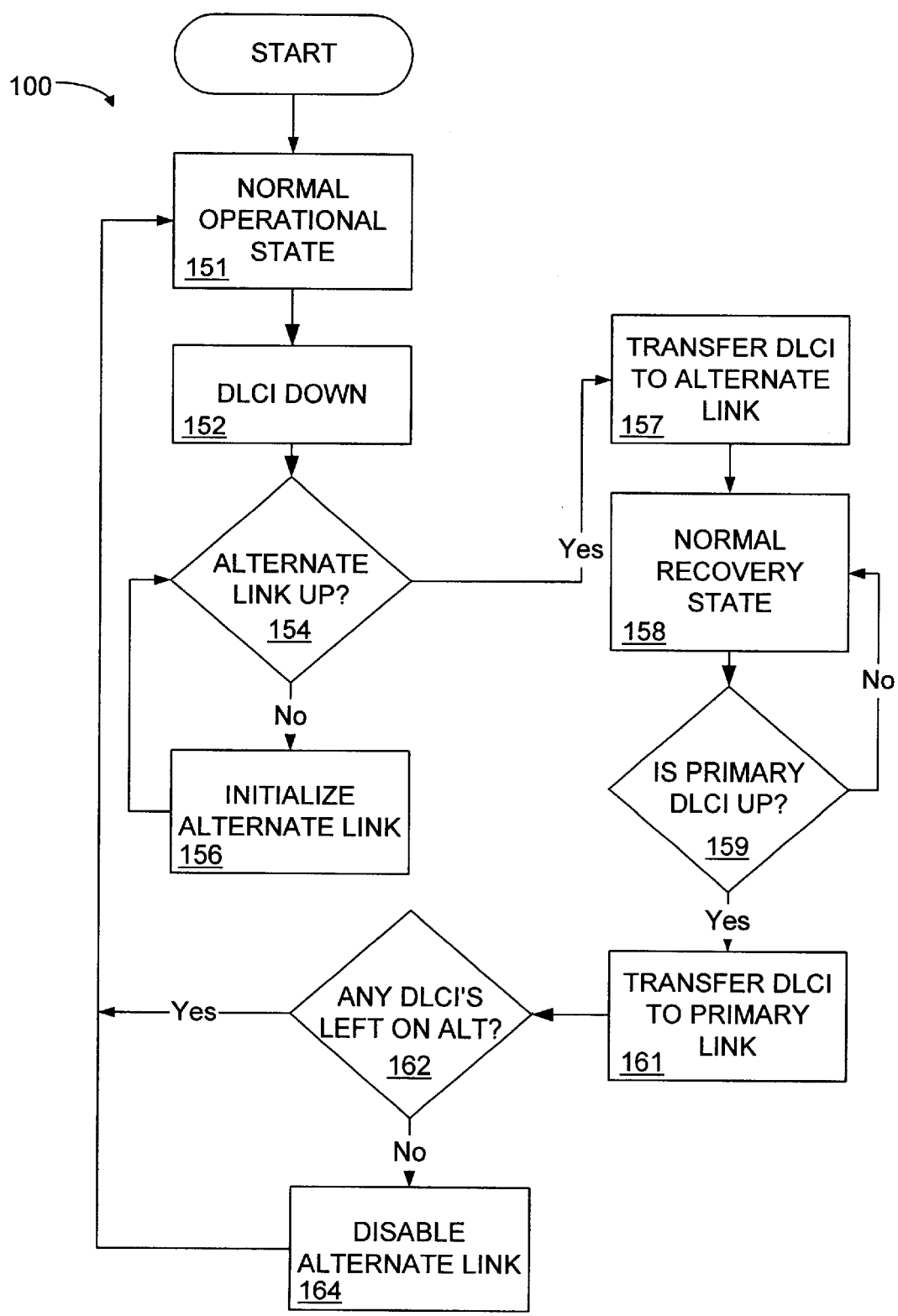
FIG. 5 is a flow diagram illustrating the operation of the virtual circuit backup logic of FIGS. 3 and 4.

FIG. 5 shows a flow chart 100 illustrating the operation of the virtual circuit backup logic 100. In block 151, a normal operational state is shown in which all primary virtual circuits are operating.

In block 152, a DLCI down condition is indicated. A DLCI down condition indicates that either physical failure detection logic 110 or logical failure detection logic 120 has sensed a virtual circuit failure, which may be reported by the LMI protocol or may be inferred by the failure of the LMI protocol. Alternatively, a proprietary detection of a virtual circuit failure or the violation of a performance threshold, for example a high error rate, may indicate a DLCI down condition.

In decision block 154, it is determined whether an alternate link is up. The underlying logic of the preferred embodiment for this step is as follows.

IF the primary destination circuit is in an alarm state (as detected by the virtual circuit backup logic 100) OR
IF the primary link is disabled OR
IF the primary circuit is disabled AND
IF the alternate link is enabled AND
IF the source LMI is not in alarm
THEN switch to alternate destination
ELSE restore to primary destination.

If the alternate link is not up, then in block 156 an alternate link is initiated, for example, through the operation of DBM 49 and alternate ISDN network 14 or PSTN network 24. Alternatively, a secondary path may be established using an external modem (15a I FIG. 1) or ISDN termination adapter, or a secondary path (29 in FIG. 1) may be established on the same physical path as the primary path, but on a specified alternate virtual circuit. If the alternate link is up, then in block 157 the failed DLCI is transferred to the alternate link.

In block 158, normal data recovery takes place over the alternate link, for example links 26a and 26b, or links 27a and 27b of FIG. 1.

In decision block 159, the system queries to determine whether the primary link has been restored or is otherwise again available. The logic used to determine the availability of the primary link in the preferred embodiment is as follows.

IF the primary destination circuit is in an alarm state (as detected by the virtual circuit backup logic 100) OR
IF the primary link is disabled OR
IF the primary circuit is disabled AND
IF the alternate link is enabled AND
IF the source LMI is not in alarm
THEN switch to alternate destination
ELSE restore to primary destination.

If the primary link is unavailable then normal recovery transmission proceeds along the backup path. If the primary link is available, then in block 161 the DLCI is transferred back to the primary link, for example connection 21 in FIG. 1. In decision block 162, it is determined whether there are any DLCI's left on the alternate connection. When all DLCI's are transferred back to their primary link and the alternate link is no longer needed, the alternate link can be deactivated It should be noted that DLCI's may be transferred back to the primary link one at a time until all the DLCI's are back to the primary link.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

Therefore, the following is claimed:

1. A system for fault detection and rerouting of information from a primary path to an alternate path in a communication network, comprising:
   means for detecting, in a communication device operating at a data link layer and having awareness of a physical layer to which said communication device is attached, a failure in a primary path virtual circuit of a communication system having an endpoint, said failure including any of a physical failure, a logical management interface (LMI) failure, and a data link connection identifier (DLCI) failure;
   means for classifying said failure; and
   means for rerouting information to said endpoint over an alternate path to avoid said failure without having to wait for the indication of a logical link failure.

2. The system of claim 1, wherein said virtual circuit is a permanent virtual circuit.

3. The system of claim 1, wherein said virtual circuit is a switched virtual circuit.

4. The system of claim 1, wherein said failure is a physical failure.

5. The system of claim 1, wherein said failure is a logical failure.

6. The system of claim 5, wherein said logical failure is used to determine said affected virtual circuit.

7. The system of claim 5, wherein said logical failure is a data link control identifier (DLCI) failure as reported by a logical management interface (LMI).

8. The system of claim 1, wherein said means for rerouting further includes a port connected to an external communications device.

9. The system of claim 1, wherein said means for rerouting further includes a dial backup module connecting to said alternate path.

10. The system of claim 1, wherein said means for rerouting further includes the same physical path as said primary path, wherein said same physical path provides said alternate virtual circuit.

11. The system of claim 1, wherein said alternate path is specified for each primary data link control identifier (DLCI) by a user.

12. The system of claim 1, further comprising means for restoring said rerouted information to said primary path when said primary path becomes available.

13. The system of claim 12, wherein said rerouted information is restored to said primary path for each data link control identifier (DLCI).

14. A method for fault detection and rerouting of information from a primary path to an alternate path in a communication network, comprising the steps of:
   detecting, in a communication device operating at a data link layer and having awareness of a physical layer to which said communication device is attached, a failure in a primary path virtual circuit of a communication system having an endpoint, said failure including any of a physical failure, a logical management interface (LMI) failure, and a data link connection identifier (DLCI) failure;
   classifying said failure; and
   rerouting information to said endpoint over an alternate path to avoid said failure without having to wait for the indication of a logical link failure.

15. The method of claim 14, wherein said virtual circuit is a permanent virtual circuit.

16. The method of claim 14, wherein said virtual circuit is a switched virtual circuit.

17. The method of claim 14, wherein said failure is a physical failure.

18. The method of claim 14, wherein said failure is a logical failure.

19. The method of claim 18, wherein said logical failure is used to determine said affected virtual circuit.

20. The method of claim 18, wherein said logical failure is a data link control identifier (DLCI) failure as reported by a logical management interface (LMI).

21. The method of claim 14, wherein said step of rerouting further includes the step of using a port connected to an external communications device for accessing said alternate path.

22. The method of claim 14, wherein said step of rerouting further includes the step of using a dial backup module for accessing said alternate path.

23. The method of claim 14, wherein said step of rerouting further includes the step of using the same physical path as said primary path, wherein said same physical path provides said alternate virtual circuit.

24. The method of claim 14, wherein said alternate path is specified for each primary data link control identifier (DLCI) by a user.

25. The method of claim 14, further comprising the step of restoring said rerouted information to said primary path when said primary path becomes available.

26. The method of claim 25, wherein said rerouted information is restored to said primary path for each data link control identifier (DLCI).

27. A system for fault detection and rerouting of information from a primary path to an alternate path in a communication network, comprising:
   a failure detector, located in a communication device operating at a data link layer and having awareness of a physical layer to which said communication device is attached, configured to detect a failure in a primary path virtual circuit of a communication system having an endpoint, said failure including any of a physical failure, a logical management interface (LMI) failure, and a data link connection identifier (DLCI) failure;
   logic configured to classify said failure; and rerouting logic configured to reroute information to said endpoint over an alternate path to avoid said failure without having to wait for the indication of a logical link failure.

28. The system of claim 27, wherein said virtual circuit is a permanent virtual circuit.

29. The system of claim 27, wherein said virtual circuit is a switched virtual circuit.

30. The system of claim 27, wherein said failure is a physical failure.

31. The system of claim 27, wherein said failure is a logical failure.

32. The system of claim 31, wherein said logical failure is used to determine said affected virtual circuit.

33. The system of claim 31, wherein said logical failure is a data link control identifier (DLCI) failure as reported by a logical management interface (LMI).

34. The system of claim 27, wherein said rerouting logic further includes a port connected to an external communications device.

35. The system of claim 27, wherein said rerouting logic further includes a dial backup module connecting to said alternate path.

36. The system of claim 27, wherein said rerouting logic further includes the same physical path as said primary path, wherein said same physical path provides said alternate virtual circuit.

37. The system of claim 27, wherein said alternate path is specified for each primary data link control identifier (DLCI) by a user.

38. The system of claim 27, further comprising restoring logic configured to restore said rerouted information to said primary path when said primary path becomes available.

39. The system of claim 38, wherein said rerouted information is restored to said primary path for each data link control identifier (DLCI).

40. A computer readable medium having a program for fault detection and rerouting of information from a primary path to an alternate path in a communication network, the medium comprising:

failure detector logic, located in a communication device operating at a data link layer and having awareness of a physical layer to which said communication device is attached, configured to detect a failure in a primary path virtual circuit of a communication system having an endpoint, said failure including any of a physical failure, a logical management interface (LMI) failure, and a data link connection identifier (DLCI) failure;

logic configured to classify said failure; and rerouting logic configured to reroute information to said endpoint over an alternate path to avoid said failure without having to wait for the indication of a logical link failure.

\* \* \* \* \*